Sept. 6, 1966     A. A. BUEHLER     3,270,823
DRILL PIPE HANDLING APPARATUS
Filed Oct. 25, 1963     4 Sheets-Sheet 1
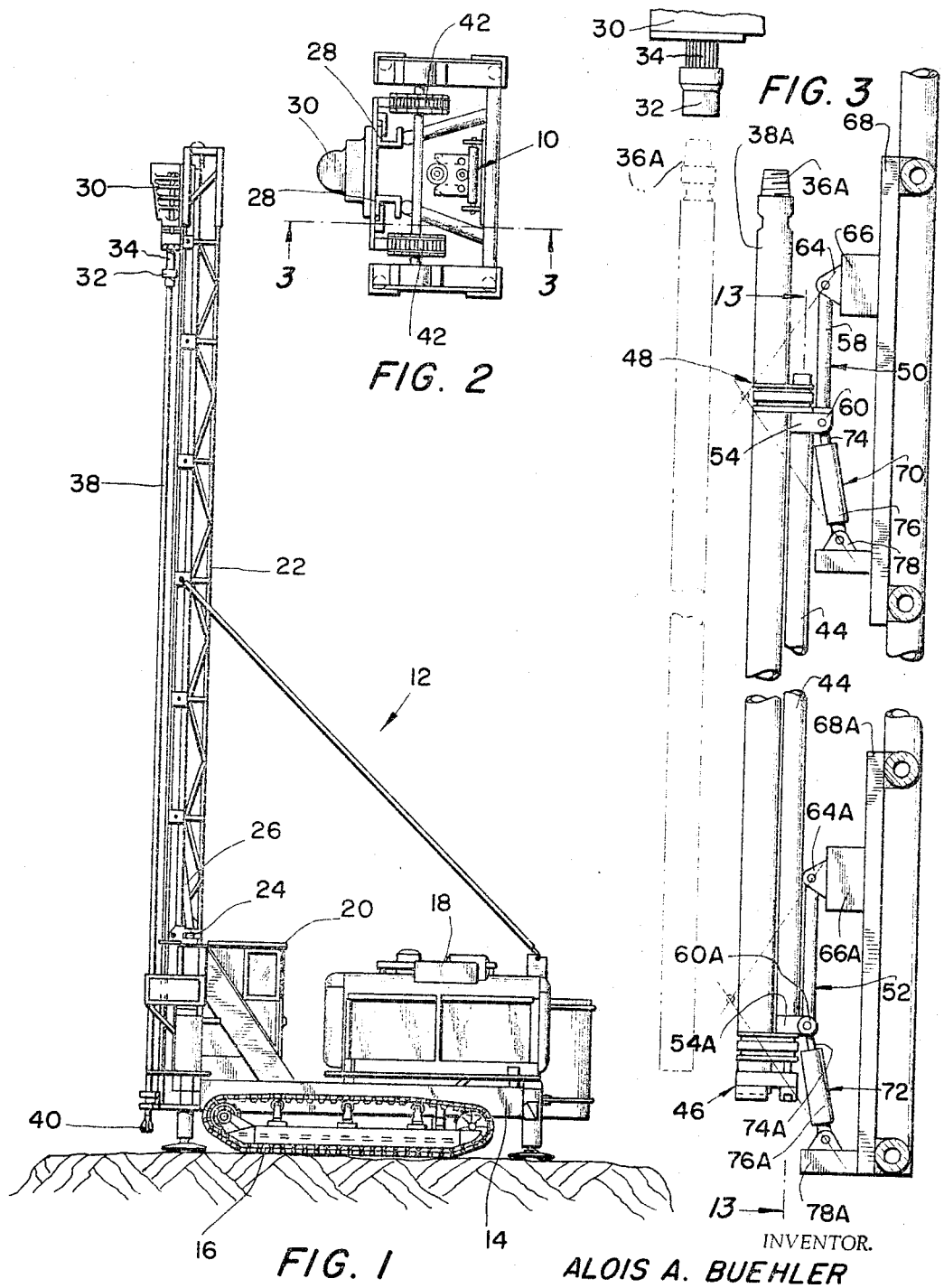
INVENTOR.
ALOIS A. BUEHLER
BY
ATTORNEY Sept. 6, 1966   A. A. BUEHLER   3,270,823
DRILL PIPE HANDLING APPARATUS
Filed Oct. 25, 1963   4 Sheets-Sheet 2

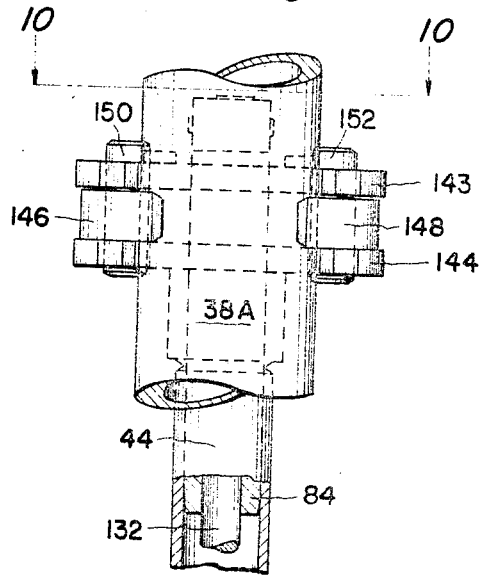
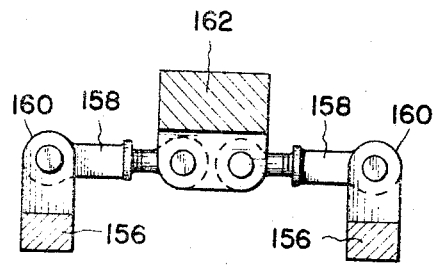
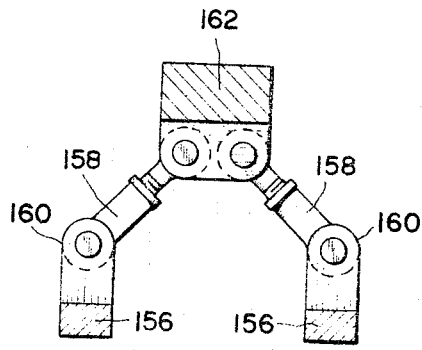
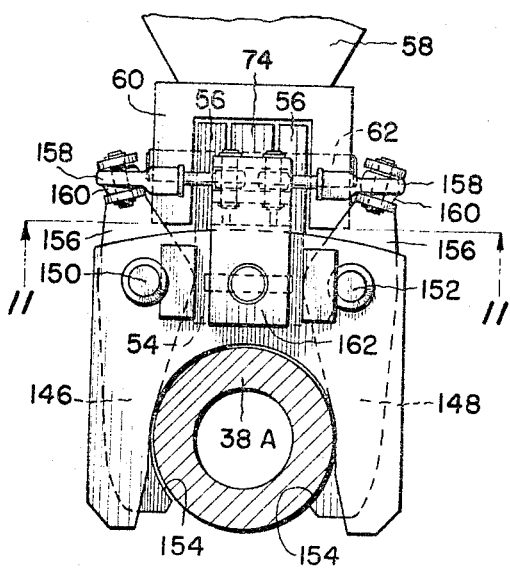

Sept. 6, 1966     A. A. BUEHLER     3,270,823
DRILL PIPE HANDLING APPARATUS
Filed Oct. 25, 1963     4 Sheets-Sheet 4
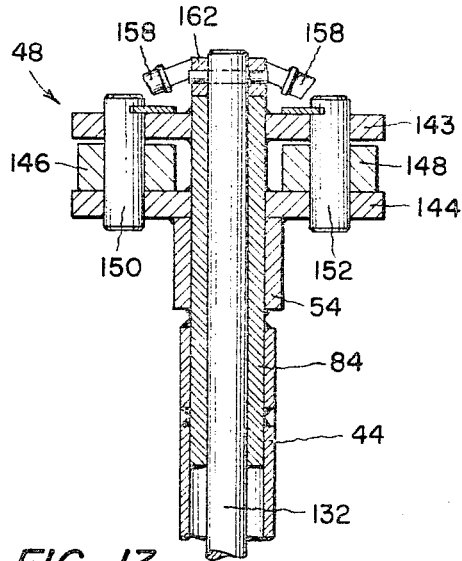
FIG. 13
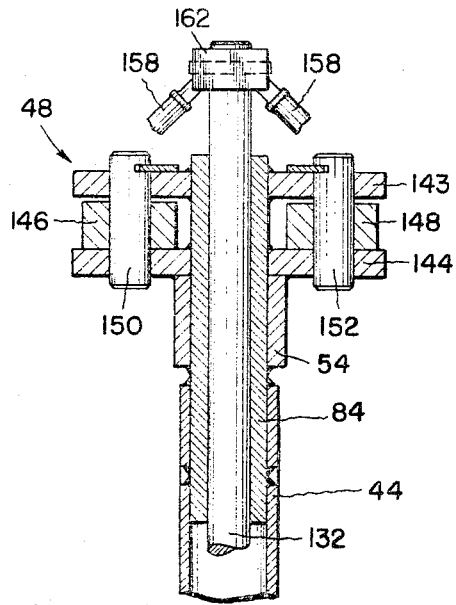
FIG. 14
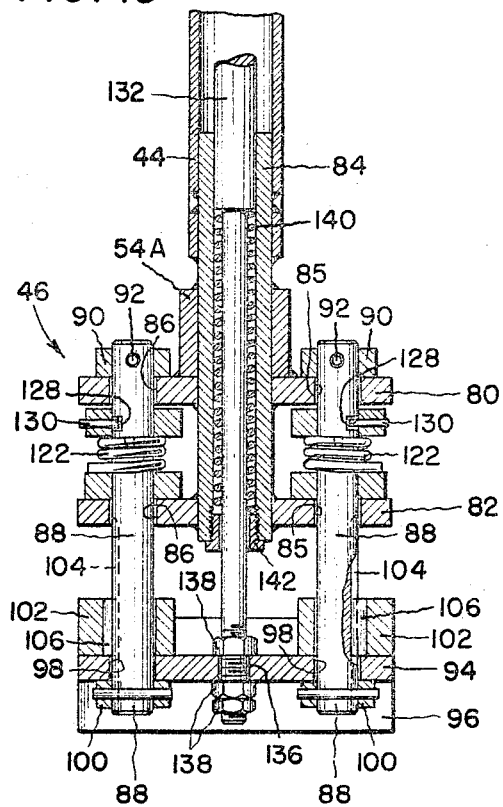
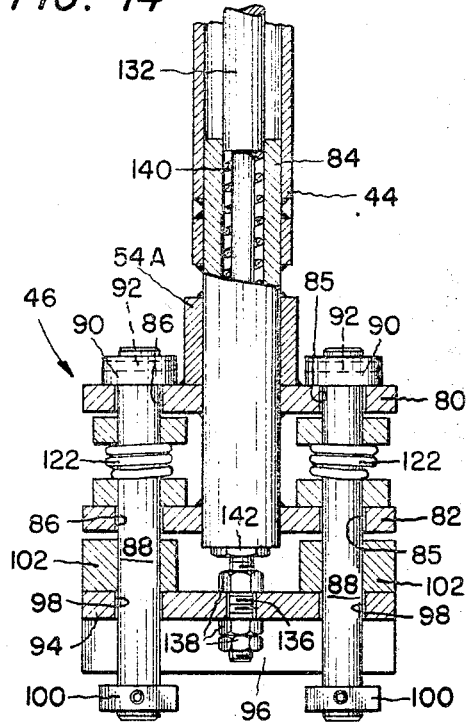
INVENTOR.
ALOIS A. BUEHLER
BY
Arthur Frederick
ATTORNEY

United States Patent Office 3,270,823
Patented Sept. 6, 1966

3,270,823
DRILL PIPE HANDLING APPARATUS
Alois A. Buehler, Easton, Pa., assignor to Ingersoll-Rand Company, New York, N.Y., a corporation of New Jersey
Filed Oct. 25, 1963, Ser. No. 318,876
6 Claims. (Cl. 175—85)

This invention relates to a drill pipe handling apparatus for facilitating the changing of drill pipes of a drill string.

Conventional drill pipe handling equipment is generally constructed in the form of a rack adapted to support a plurality of drill pipes in spaced relationship. These conventional racks are usually mounted on the drill tower adjacent the rotary drilling head and are movable to a position under the latter for the transfer of drill pipes between the rack and the rotary drilling head. Since the drill pipe handling equipment is at least partially supported by the adjacent drill tower, undesirable torsional stresses are imposed on the drill tower. Also, the time required to effect a change of a drill pipe is relatively long by reason of the distance and the amount of movement of the drill pipe necessary to effect the change of a drill pipe. In addition, such multiple drill pipe handling apparatuses are unnecessarily bulky and expensive for blast hole drilling in open pit mining operations where blast holes are bored not more than two pipe lengths in depth.

It is, therefore, an object of the present invention to provide a drill pipe handling apparatus of relatively simple, inexpensive construction which is capable of rapidly effecting a change of drill pipe.

It is another object of this invention to provide a drill pipe handling apparatus supported by a drill tower wherein torsional stresses on the drill tower are eliminated.

A further object of the present invention is to provide a drill pipe handling apparatus of compact design and capable of being supported wholly within a drill tower.

Accordingly, the present invention contemplates, in combination with a drill tower slidably supporting thereon a rotary drilling head, a novel drill pipe handling apparatus comprising an elongated housing member supporting adjacent opposite ends thereof, pipe gripping means for engaging and supporting a drill pipe. The housing member is hingedly connected to a supporting frame which is secured to the drill tower so as to support the housing member interiorly of the drill tower. A fluid motor means including at least one double-acting piston and cylinder mechanism is connected to the supporting frame and the housing member to move the housing member and position the drill pipe in alignment with the rotary drilling head when a drill pipe is to be added to a drill string, or move a drill pipe out of alignment with the rotary drilling head when a drill pipe is to be removed from a drill string.

The pipe gripping means includes an upper set of jaws and a lower set of jaws interconnected so as to operate simultaneously to grip a drill pipe and simultaneously release a drill pipe in response to the weight of the drill pipe.

In addition to the foregoing, the drill pipe handling apparatus includes power-actuated gripping means for grasping the drill pipe to prevent its rotation when the drill head is rotated to thereby disconnect the drill pipe from the drill pipe chuck of the rotary head.

The invention will be more fully understood from the following description thereof when considered in connection with the accompanying drawings in which:

FIG. 1 is a view in side elevation of a mobile drilling ring having a drill pipe handling apparatus according to this invention incorporated therein;

FIG. 2 is a top plan view of the drill tower shown in FIG. 1;

FIG. 3 is a fragmentary view in section taken along line 3—3 of FIG. 2 and showing the drill pipe handling apparatus in elevation and on an enlarged scale, parts being omitted for the sake of clarity;

Figure 4:
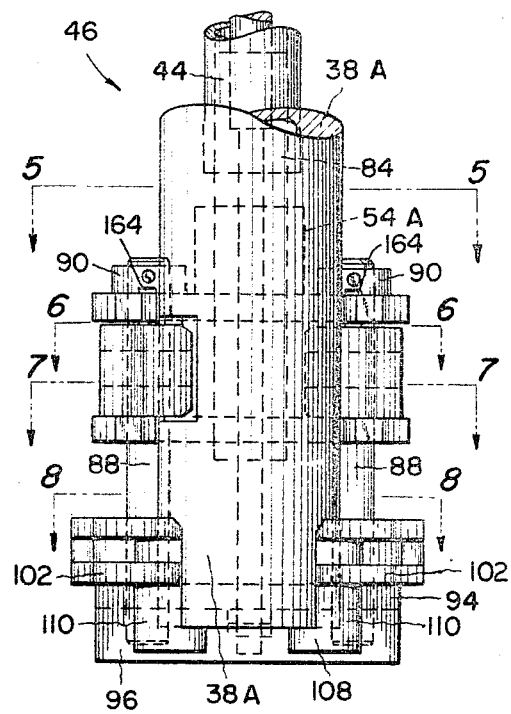
FIG. 4 is a fragmentary view in elevation of the lower drill pipe gripping assembly with a drill pipe held therein.

FIGS. 5, 6, 7, and 8 are cross-sectional views taken along lines 5—5, 6—6, 7—7, and 8—8 of FIG. 4, respectively;

FIG. 9 is a fragmentary view in elevation of the upper drill pipe gripping assembly with a drill pipe held therein;

FIG. 10 is a view in cross section taken along line 10—10 of FIG. 9;

FIG. 11 is a cross-sectional view taken substantially along line 11—11 of FIG. 10;

FIG. 12 is a cross-sectional view, similar to FIG. 11, showing another operative position;

FIG. 13 is an enlarged longitudinal view in section taken substantially along lines 13—13 of FIG. 3 and showing the upper and the lower drill pipe gripping assemblies; and FIG. 14 is a view, similar to FIG. 13, showing another operative position of the apparatus.

Now referring to the drawings and more particularly to FIGS. 1, 2, and 3, the reference numeral 10 generally designates a drill pipe handling apparatus shown as applied to a mobile drill rig 12 of more or less conventional construction.

The drill rig 12 comprises a base 14 supported on a pair of endless tractor treads 16 (only one of which is shown), which base 14 supports an air compressor unit 18, a control cab 20, and a drill tower 22.

The drill tower 22 is pivotally connected at 24 to base 14 so that the tower can be actuated by a fluid motor 26 to a horizontal position parallel to the base or any intermediate position between full horizontal and vertical positions for angle drilling. The drill tower supports longitudinally extending, spaced, parallel drill guides 28 which support for slidable movement relative to the drill tower a rotary drill head 30.

The rotary head 30 has a drill pipe chuck or spindle chuck 32 which is connected for rotation to a spindle driver 34 and has a threaded bore (not shown) to receive therein the threaded end portion (not shown) of a drill pipe 38. Attached to the opposite end of drill pipe 38 is a rock drill bit 40. Rotary head 30 is moved relative to the drill tower by suitable drive means, such as a pair of chain and sprocket assemblies 42 (see FIG. 2) supported on the drill tower and driven by a fluid motor (not shown). Since the drill pipe handling apparatus 10 is supported wholly within the drill tower framework, as will be more fully explained hereinafter, the drill tower framework is so constructed and arranged and drill guides 28 are supported by the drill tower framework in such a manner that, when the rotary head 30 is in the uppermost position as shown in FIG. 1, an unobstructed space is provided adjacent the drill pipe handling apparatus 10 whereby movement of a drill pipe 38a supported by apparatus 10 can be moved into and out of alignment with rotary head 30 as illustrated by the broken lines in FIG. 3.

To provide for operating the rotary head, the drill bit, and other pneumatic and hydraulic equipment, suitable air compressor lines, hydraulic lines, pumps, and controls (not shown) are provided. Such equipment is well known by those skilled in the art; and, since such equipment is not directly related to the invention or required for an understanding thereof, it is deemed unnecessary to show or describe this conventional equipment.

The drill pipe handling apparatus 10 comprises, as best shown in FIGS. 3 and 13, an elongated hollow housing 44 dimensioned to extend substantially the full length of drill pipes 38 and 38A. At the lower end of housing 44 is connected a lower drill pipe supporting and gripping assembly 46, while at the upper end is connected an upper drill pipe supporting and gripping assembly 48. To support housing 44, an upper and a lower linkage mechanisms 50 and 52, respectively, are provided adjacent the upper and the lower drill pipe supporting and gripping assemblies 48 and 46, respectively.

As best illustrated in FIGS. 3 and 10, upper linkage mechanism 50 comprises a bracket 54 suitably secured to housing 44 and having a pair of spaced ears 56 projecting outwardly from the housing. A link 58 is provided at one end with a U-shaped bracket 60 which is dimensioned so as to receive between the legs thereof ears 56 of bracket 54. The ears 56 of bracket 54 and the legs of bracket 60 are provided with registered openings through which passes a pivot pin 62. The opposite end of link 58 is pivotally connected to the ears 64 of a mounting bracket 66 which is secured to a support plate 68, the support plate 68 being secured, as by welding, to the framework of drill tower 22.

Figure 5:
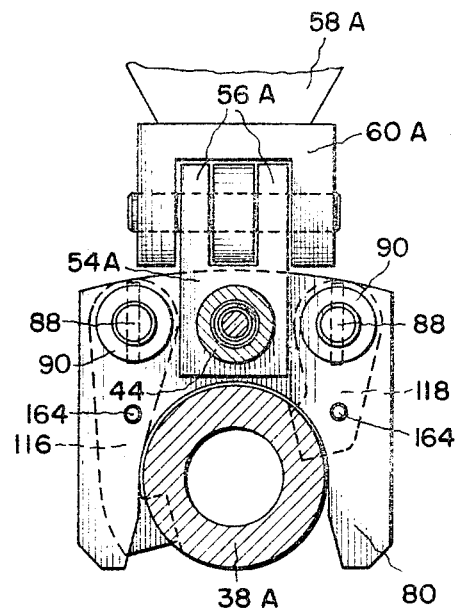

As shown in FIGS. 3 and 5, lower linkage mechanism 62 is of identical construction to upper linkage mechanism 50 and, therefore, will not be described herein. However, parts of lower linkage mechanism 52 corresponding to like parts of upper linkage mechanism 50 will be identified by the same reference number with the suffix A added thereto.

To provide for actuation or movement of housing 44, fluid motors, such as double-acting piston and cylinder mechanisms 70 and 72, are disposed adjacent the upper and the lower linkage mechanisms 50 and 52, respectively. Each of the piston and cylinder mechanisms 70 and 72 is of any well-known construction. As best shown in FIGS. 3 and 10, the distal end of piston rod 74 of piston and cylinder mechanism 70 is located between ears 56 of bracket 54 and is pivotally connected to bracket 54 by pin 62 of linkage mechanism 50, while cylinder portion 76 is pivotally connected to a bracket 78 secured to support plate 68. Since piston and cylinder mechanism 72 is of identical construction as piston and cylinder mechanism 70 and is identically connected to bracket 54A of linkage mechanism 52, like parts thereof will be designated by the same reference numbers with the suffix A added thereto.

Each of the piston and cylinder mechanisms 70 and 72 is suitably connected to a source of pressurized fluid (not shown) and is interconnected in a conventional manner (not shown) to provide synchronized operation of the mechanisms so that housing 44 and drill pipe 38A, carrier by the latter, are moved simultaneously in vertical and horizontal planes without tilting thereof.

The lower drill pipe supported and gripping assembly 46, as best shown in FIGS. 4, 5, 6, 7, 13, and 14, is constructed as hereinafter described.

Two spaced, parallel, horseshoe-shaped plates 80 and 82 are secured, as by welding, to a lower tubular member 84 which extends normal to the plane of the plates and is dimensioned to be receivable in the lower end of housing 44. Member 84 is fixedly secured to housing 44 and form a part of the latter. Plates 80 and 82 are dimensioned and have a configuration conforming to drill pipe 38A so that the latter is receivable between the legs of the plates. Plates 80 and 82 are each provided with a pair of holes 85 and 86 which register with each other to receive therethrough a pair of rods 88. Each rod 88 is supported at the upper end thereof by plate 80 through a washer 90 secured to the rod by a pin 92. Mounted on the lower ends of rods 88 is a plate 94 which has dependent flanges 96 extending along opposite sides thereof. The plate 94 has two spaced holes 98 through which the lower ends of rods 88 extend, the plate being prevented from sliding from rods 88 by square-shaped washers 100 pinned to the lowermost end portion of each of the rods. Square-shaped washers 100 are dimensioned to fit between flanges 96 of plate 94 so that, in the position shown in FIG. 13, washers 100 cooperate with flanges 96 to prevent rotation of rods 88.

Figure 8:
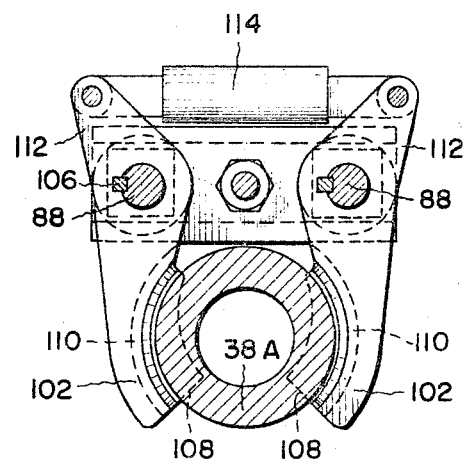

Mounted on plate 94 and connected to each of the rods 88 for conjoined rotation therewith is a supporting and gripping jaw 102. As best shown in FIGS. 8 and 13, each of the rods 88 is provided with a longitudinally extending keyway 104 which slidably receives a portion of a key 106 secured in jaw 102. The key and keyway arrangement permits jaws 102 to move axially relative to rods 88 and, at the same time, provides conjoined rotative movement of jaws 102 and rods 88. As shown in FIGS. 4 and 8, each of the jaws 102 has horizontally extending, integral base portions 108 for engaging and supporting the end of drill pipe 38A. Each of the jaws 102 is also provided with arcuate-shaped vertical portions 110 adapted to engage the periphery of drill pipe 38A. To rotate jaws 102 toward and away from engagement with drill pipe 38A, each of the jaws 102 has an integral arm portion 112 extending away from rods 88, which arm portions 112 are pivotally connected to a fluid motor 114 of the piston-cylinder type. As shown in FIG. 8, the piston of fluid motor 114 is pivotally connected to one of the arm portions 112, while the cylinder of the fluid motor is pivotally connected to the other of the arm portions 112. The fluid motor 114 may be of any suitable type, such as a double-acting piston and cylinder mechanism or a single-acting piston and cylinder mechanism. Fluid motor 114 is shown as a single-acting piston and cylinder mechanism having a spring (not shown) to bias the piston in the extended position and pivot jaws 102 to an open position and suitable portion (not shown) to provide pressurized fluid to effect retraction of the piston and closing of jaws 102. The latter type of fluid motor 114 is considered preferable since it is less expensive and simpler in construction.

Figure 6:
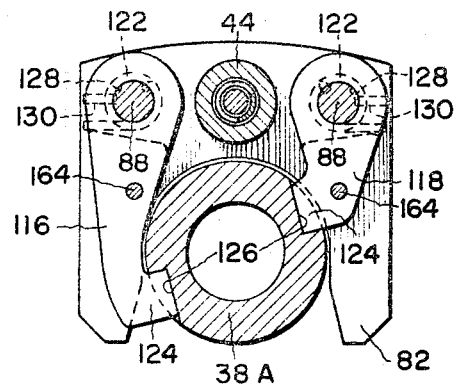
Figure 7:
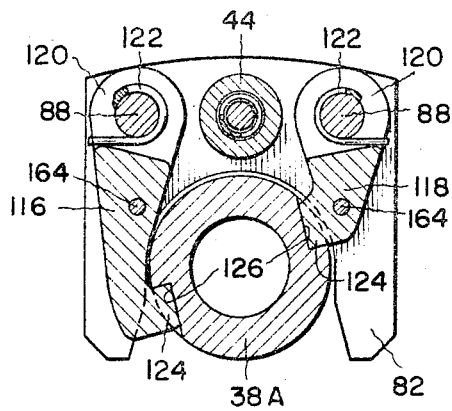

Mounted on rods 88 between plates 80 and 82 is a long arm or tong 116 and a short arm or tong 118. Each of the tongs 116 and 118 has a slotted or notched end portion 120 through which pass rods 88. A coil spring 122 is disposed around each of the rods 88 in the notched end portion 120 of tongs 116 and 118. As best shown in FIG. 6, one end of spring 122 is anchored in the rod around which the spring is disposed, while the opposite end bears against the bottom of notched end portion 120 of the associated tong. The springs 122 function to bias tongs 116 and 118 in a closed position. The distal ends of tongs 116 and 118 are provided with inwardly extending jaws 124 which are adapted to engage flats or recesses 126 formed in the peripheral surface of drill pipe 38A. Tongs 116 and 118 function, where a drill pipe 38A is to be removed from the drill string, to hold the drill pipe against rotation as the spindle chuck 32 of the rotary head is turned to disconnect it from the drill pipe.

To provide for opening and closing of tongs 116 and 118 when supporting and gripping jaws 102 are rotated by fluid motor 114 to open and closed positions, each of the rods 88 is provided with an arcuate groove 128, the end walls of which form the shoulders. A pin 130 is secured in each of the tongs 116 and 118 to extend into groove 128. Upon rotation of rods 88, pins 130 abut the shoulders formed by grooves 128 thereby pivoting tongs 116 and 118 to a closed or open position depending upon the direction of rotation of rods 88.

The lower drill pipe supporting and gripping assembly 46, as best shown in FIGS. 13 and 14, is connected to upper drill pipe supporting and gripping assembly 48 by a weight-actuated synchronizing means. The weight-actuated synchronizing means comprises an elongated connecting rod 132 which is disposed for axial slidable movement in housing 44. Connecting rod 132 is slidably supported in tubular members 84 which are disposed at opposite ends of housing 44 and are secured to the housing to form a part of the latter. The lower end portion of connecting rod 132 is of reduced diameter and passes through a hole 136 in plate 94. The end portion of the reduced diameter portion of rod 132 is threaded to receive nuts 138 and secure rod 132 to plate 94. A spring 140 is disposed around the reduced diameter portion of rod 132, which spring bears, at one end, against an annular shoulder formed by the reduced diameter portion and, at the opposite end, against a plug 142 threadably secured in the end of lower tubular member 84. Spring 140 serves to bias rod 132 in an upward direction so that, when the weight of drill pipe 38A is removed from supporting and gripping jaws 102, rod 132 and plate 94 are moved upwardly relative to housing 44 and rods 88 to the position shown in FIG. 14. This upward movement of rod 132 actuates the gripping jaws of upper supporting and gripping assembly 48 as will be hereinafter explained.

As best shown in FIGS. 9, 10, 13, and 14, upper supporting and gripping assembly 48 comprises two spaced, parallel plates 143 and 144 of horseshoe shape, similar to plates 80 and 82, which are secured to housing 44 and more particularly to upper tubular member 84 of housing 44. Between plates 143 and 144 are pivotally mounted gripping jaws 146 and 148, jaws 146 and 148 being pivotally mounted on pins 150 and 152, respectively, which are secured in plates 143 and 144. Jaws 146 and 148 are each provided with a curved edge portion 154 complementary to the curvature of a portion of drill pipe 38A to grip the latter. As best shown in FIG. 10, each of the jaws 146 and 148 has an arm portion 156 projecting away from pivot pins 150 and 152 in an opposite direction from jaws 146 and 148.

To pivotally actuate jaws 146 and 148 to open and closed positions, each of the arm portions 156 is connected to one end of a link 158 through a ball-and-socket-type connection 160. The opposite end of each link 158 is pivotally connected to a bracket 162 secured to the upper end of connecting rod 132.

As illustrated in FIGS. 11, 12, 13, and 14, when connecting rod 132 is urged upwardly by spring 140 to the position shown in FIG. 14, links 158 are pulled upwardly as shown in FIG. 12. This upward movement of links 158 exerts a pull upon the arm portions 156 of jaws 146 and 148 causing the jaws to pivot about their respective pins 150 and 152. When connecting rod 132 is moved downwardly under the force exerted by the weight of a drill pipe, links 158 are pulled downwardly to the position shown in FIGS. 10 and 11. This downward pull of links 158 pivots jaws 146 and 148 inwardly toward the drill pipe 38A so that the curved edge portions 154 of the jaws grip the drill pipe.

In operation of the drill pipe handling apparatus 10, where it is desired to add drill pipe 38A to the drill string, the operator actuates suitable controls (not shown) to deliver pressurized fluid simultaneously to piston and cylinder mechanisms 70 and 72 and thereby cause piston rods 74 and 74A to extend from their respective cylinders 76 and 76A. Extension of piston rods 74 and 74A moves housing 44 and drill pipe 38A laterally and upwardly to position drill pipe 38A into alignment with rotary head 30. The rotary head is then lowered to bring the spindle chuck 32 of the rotary head into engagement with the threaded end 36A of drill pipe 38A. The spindle chuck 32 is rotated to turn the spindle chuck upon threaded end 36A of the drill pipe. Rotation of drill pipe 38 is prevented as the spindle chuck is turned upon the threaded end 36A of drill pipe 38A by tongs 116 and 118 which engage flats or recesses 126 formed in the surface of drill pipe 38A. As the spindle chuck 32 is turned upon threaded end 36A of drill pipe 38A, the drill pipe is lifted slightly upwardly toward rotary head 30, but this upward movement of drill pipe 38A is not sufficient to allow flanges 96 of plate 94 to clear engagement with square washers 100. Therefore, the rotary head is moved upwardly on tower 22, after threaded end 36A of the drill pipe is fully mated with spindle chuck 32, to remove the weight of the drill pipe from supporting and gripping jaws 102 and plate 94 for a sufficient distance to permit flanges 96 of plate 94 to move out of engagement with square washers 100. With the release of the weight of the drill pipe on plate 94, the plate is pulled upwardly under the urging of spring 140 by connecting rod 132. The upward movement of connecting rod 132 pivots jaws 146 and 148 of the upper supporting and gripping assembly 48 to an open position in the manner previously described.

When plate 94 moves upwardly a sufficient distance so that dependent flanges 96 clear square washers 100, rods 88 are freed for rotation. After rods 88 are freed for rotation, the spring (not shown) in fluid motor 114 (see FIG. 8) forces the piston rod of the fluid motor to retract and thereby pivot jaws 102 to an open position. The pivotal movement of jaws 102 causes rotation of rods 88. The rotation of rods 88 pivots tongs 116 and 118 to an open position by reason of the abutment of the shoulders formed by arcuate grooves 128 in rods 88 against pins 130. The lost motion provided by grooves 128 insures that tongs 116 and 118 will release the drill pipe only after the spindle chuck 32 is fully turned upon threaded end 36A of drill pipe 38A.

After the drill pipe is connected to spindle chuck 32 of rotary head 30, the lower end of the drill pipe connected to the drill string, and with jaws 102, 146, and 148 and tongs 116 and 118 in an open position, the piston and cylinder mechanisms 70 and 72 are actuated to a retracted position which is shown in full lines in FIG. 3.

If it is anticipated that a third drill pipe will be required, a drill pipe may be inserted into the drill pipe handling apparatus 10 by lowering the drill pipe during the drilling operation onto drill pipe handling apparatus 10 through the top of drill tower 22.

To utilize drill pipe handling apparatus 10 for removing a drill pipe from the drill string after completion of the boring operation, rotary head 30 is moved to the upper part of drill tower 22 to lift the drill pipe out of the bored hole. The piston and cylinder mechanisms 70 and 72 are actuated to an extended position so that the drill pipe of the drill string is positioned between the legs of plates 80, 82, 143, and 144. The connection or joint between the bottom of the drill pipe to be removed and the upper end of the other drill pipe of the drill string is broken by means of rotation of the drill pipe by rotary head 30 and conventional power tongs (not shown) mounted on the tower. After the drill pipe to be removed is disconnected from the next lower drill pipe, the drill pipe is lifted by rotary head 30 to a point above jaws 102 of supporting and gripping assembly 46. The fluid motor 114 (FIG. 8) is then actuated to an extended position to thereby close jaws 102 and rotate rods 88, the rotation of rods 88 effecting the closing of tongs 116 and 118 by abutment of the shoulders formed by grooves 128 in rods 88 against pins 130 carried by tongs 116 and 118. The drill pipe is then lowered to rest on base portions 108 of jaws 102 so that the weight of the drill pipe forces plate 94 downwardly relative to rods 88 to the position shown in FIG. 13. With movement of the drill pipe downwardly to the position shown in FIG. 13, tongs 116 and 118 snap into flats or recesses 126 in the drill pipe under the urging of springs 122 (see FIG. 7). Also, downward movement of plate 94 causes jaws 146 and 148 of the supporting and gripping assembly 48 to close and grip the drill pipe. With jaws 102, 146, and 148 and tongs 116 and 118 engaging the drill pipe, spindle chuck 32 is rotated by the rotary head to disconnect the spindle chuck from the threaded end of the drill pipe. During the disconnection of the spindle chuck from the drill pipe, the drill pipe is held against rotation by tongs 116 and 118. Thereafter piston and cylinder mechanisms 70 and 72 are actuated to a retracted position to thereby move the drill pipe out of alignment with rotary head 30 and into drill tower 22.

It can be readily seen that square washers 100 cooperate with dependent flanges 96 of plate 94 to prevent rotation of rods 88 and hence the accidental opening of jaws 102, 146, and 148 and tongs 116 and 118 when the drill pipe handling apparatus 10 is loaded. A further safety feature is provided by removable locking pins 164 which are inserted in the registered holes in plates 80 and 82 and in tongs 116 and 118 when the drill tower is in the horizontal, traveling position. The pins 164 prevent movement of tongs 116 and 118 so that the drill pipe cannot slide out of the drill pipe handling apparatus 10.

It is believed now readily apparent that the present invention provides an improved drill pipe handling apparatus which is relatively simple and compact in construction and does not impose torsional stresses on the drill tower. It is a drill pipe handling apparatus which automatically effects rapid change of a drill pipe. It is a drill pipe handling apparatus particularly adaptable for blast hole drilling operations.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

I claim:
1. A drill pipe handling apparatus for a drill tower having a rotary head slidably supported thereon, comprising:
   (a) an elongated tubular housing disposed wholly within the drill tower,
   (b) means for movably connecting said housing to said drill tower,
   (c) a first drill pipe supporting and gripping assembly connected to said housing and comprising:
      (1) a pair of pivotally connected, coacting first jaws for engaging and holding a drill pipe,
   (d) a second drill pipe supporting and gripping assembly connected to said housing in spaced relation to said first drill pipe supporting and gripping assembly,
   (e) said second drill pipe supporting and gripping assembly comprising:
      (1) a pair of spaced U-shaped plates secured to said housing,
      (2) a third plate of inverted U-shape in cross section spaced below said pair of U-shaped plates,
      (3) a pair of pivot pins extending through registered openings in each of said pair of plates and said third plate,
      (4) tongs mounted on each of said pins between said pair of plates and connected to be pivotally moved by rotation of said pins,
      (5) said tongs being constructed and arranged to engage and prevent rotation of a drill pipe,
      (6) a pair of second jaws for engaging a drill pipe, said pair of second jaws being mounted on said third plate and including a second jaw on each of said pins for conjoined rotation with said pins so as to pivot to closed and open positions,
      (7) each of said second jaws having a horizontal flanged portion for receiving the end of the drill pipe and supporting the weight thereof,
      (8) said third plate and said second jaws being connected to said pins for slidable movement relative to said pins and said housing,
      (9) fluid motor means connected to said second jaws to actuate said second jaws to open and closed positions and thereby rotate said pins,
   (f) a connecting rod disposed for slidable movement within said tubular housing,
      (1) said connecting rod being connected at one end to said third plate and at the opposite end to said first jaws of said first drill pipe supporting and gripping assembly so that, upon release of the weight of the drill pipe from said second jaws, the first jaws are actuated to an open position, and
   (g) fluid motor means connected to said drill tower and said housing for moving said housing and a drill pipe supported by the housing out of and into the drill tower so as to position the drill pipe into alignment and out of alignment with the rotary head.

2. The apparatus of claim 1 wherein said fluid motor means comprises a pair of said double-acting piston and cylinder mechanisms.

3. The apparatus of claim 1 wherein said means for movably connecting the housing to the drill tower comprises two-spaced links each of which is pivotally connected at one end to the housing and at the opposite end pivotally connected to the drill tower.

4. The apparatus of claim 1 wherein said connecting rod is spring biased in an upward direction.

5. The apparatus of claim 1 wherein each of said tongs is biased inwardly toward a closed position by a spring.

6. The apparatus of claim 1 wherein said pins are provided with means for engaging the legs of said third plate to prevent rotation of said pins while a drill pipe engages and is supported by said second jaws.

References Cited by the Examiner
UNITED STATES PATENTS

| | | | |
|---|---|---|---|
| 1,162,144 | 11/1915 | Donze et al. | 214—2.5 |
| 2,972,388 | 2/1961 | Thornburg | 175—52 |
| 3,212,593 | 10/1965 | Reischl | 175—85 |

CHARLES E. O'CONNELL, *Primary Examiner.*

J. A. LEPPINK, *Assistant Examiner.*